J. C. COOPER.
MEANS FOR AUTOMATICALLY INFLATING PNEUMATIC TIRES.
APPLICATION FILED JUNE 28, 1920.
1,358,524.
Patented Nov. 9, 1920.
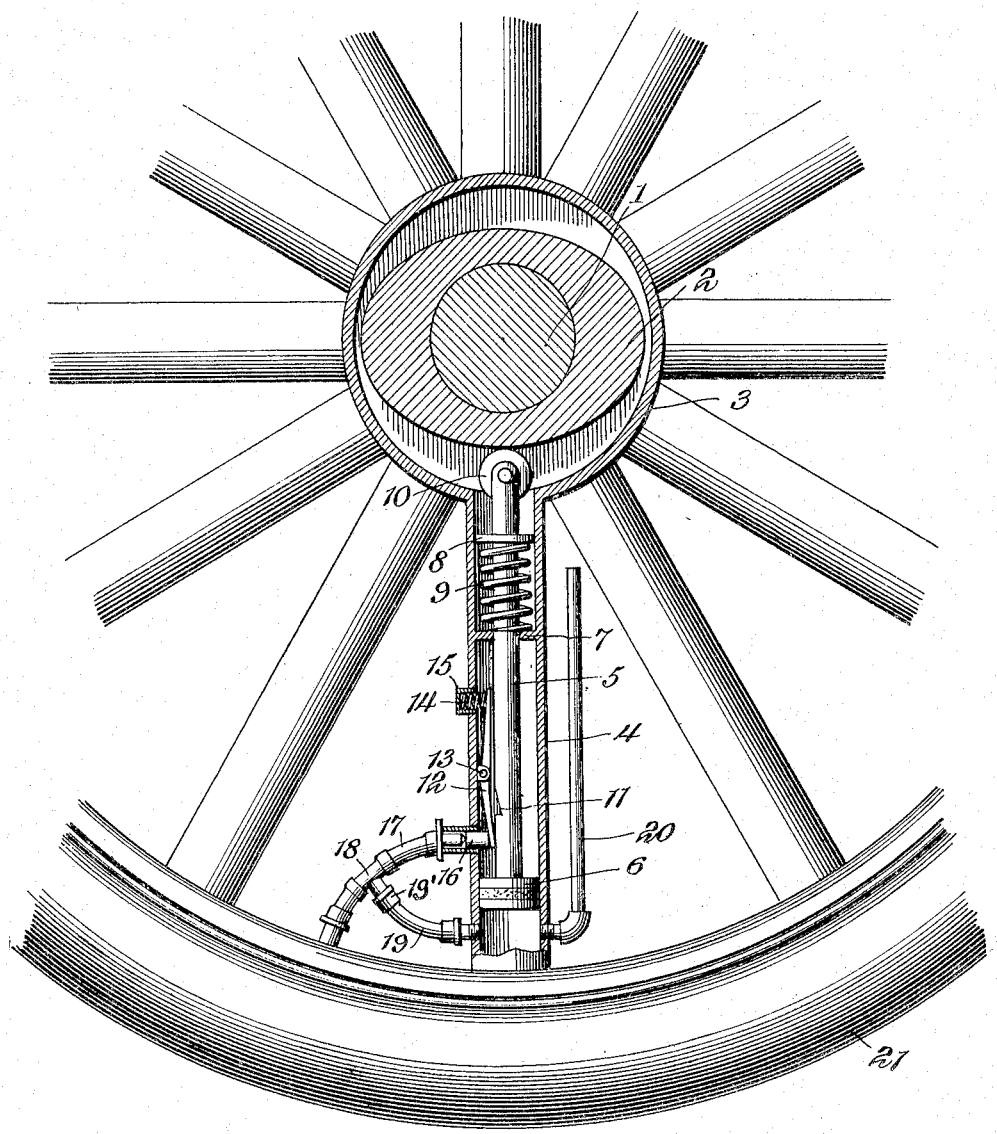
INVENTOR
J. C. Cooper
BY
James J. Heeley
ATTORNEYS

UNITED STATES PATENT OFFICE.

JOWEL CECIL COOPER, OF HEMPSTEAD, TEXAS.

MEANS FOR AUTOMATICALLY INFLATING PNEUMATIC TIRES.

1,358,524.      Specification of Letters Patent.      Patented Nov. 9, 1920.

Application filed June 28, 1920. Serial No. 392,391.

*To all whom it may concern:*

Be it known that I, JOWEL CECIL COOPER, a citizen of the United States, residing at Hempstead, in the county of Waller and State of Texas, have invented new and useful Improvements in Means for Automatically Inflating Pneumatic Tires, of which the following is a specification.

My present invention pertains to means for automatically inflating pneumatic tires, preferably those at present in use on automobile wheels, and it contemplates the provision of such a device whereby the tires will at all times be inflated with air to an even degree.

The invention further contemplates means whereby should the air escape from the tire due to a puncture or leak the rim will be prevented from injuring the tire casing, as said casing will be prevented from becoming deflated.

This advantage will obviously eliminate the necessity of an autoist having to run on a "flat" tire until such time as the tire or casing may be repaired.

The various advantages and characteristic features of my invention will be apparent from the appended specification and claims, but more especially so when the same are read in conjunction with the drawing herewith accompanying and forming part of this specification, in which:

The single view illustrates in side elevation a portion of a vehicle wheel, rim and casing and in longitudinal section I show my novel automatic inflating means as secured in proper position on the wheel and I further illustrate the vehicle spindle and my pump actuating cam in section.

To the spindle 1, I secure my novel pump actuating cam 2. The said cam by preference is of oval shape and is confined within the hub 3 of the vehicle wheel and it will be apparent that notwithstanding its shape, the cam will not prevent rotation of the wheel on the spindle or axle 1 as is necessary during movement of a vehicle in various directions.

The hub 3 is constructed and arranged so that in one point of its circumference it is provided with a casing 4 that forms a continuation of the hub. This casing 4 is secured at its end opposite the hub in any approved manner to the rim of the wheel as illustrated and prior to further description of my invention, I deem it expedient to state that this casing is preferably one spoke of the wheel. However, should it become apparent in the future practice of the invention that employing a spoke for this purpose would tend to weaken the wheel as a whole, I distinctly reserve the right by my appended claims to employ a reinforced casing of wood or other material that will not only serve its intended use in connection therewith, but will likewise serve the purposes now ascribed to the spokes of vehicle wheels.

Movable horizontally within the casing or spoke 4, when occasion demands, is a piston shaft 5 that is provided on one end with the well known air-compressing piston 6.

At a point slightly beyond the longitudinal center of the spoke or casing 4, I provide an integral collar 7 and secured on the shaft 5 slightly above the collar 7 is a member 8. Surrounding the shaft 5 is a tension spring 9 that bears at one end against the member 7 and hence movement of said spring is limited to the space between collar 7 and member 8. This spring serves a very important purpose that will be readily apparent hereinafter.

The roller bearing 10 that is secured on one end of the shaft 5 travels about and bears against the cam 2 during the actual pumping operation of my device.

Fulcrumed at 13 within the spoke or casing 4 is a trip or locking member 12 that is provided with a projection that seats in a notch 11 which notch is formed in the shaft 5 as illustrated and in order to release the projection from the notch 11 when occasion demands, I provide within a casing 15 formed in one surface of the spoke or casing 4 the spring 14 that acts and bears on one end of the locking member 12 as shown in the drawing and at its opposite end the trip or locking member 12 is actuable by an air operated plunger 16 secured in the air tube 17 which in turn is provided with the T-connection 18. This tube 17 extends into the tire rim and permits passage of air into the tire casing 21.

Secured to and communicating with the tube 17 is a tube 19 and in this tube 19 I preferably arrange a valve 19' in close proximity to the T-connection 18 and the opposite end of the tube 19 is secured by a nipple and communicates with the inside of the casing or spoke 4.

At the opposite side from the tube 19, I secure an air inlet tube 20 that communicates with the inside of the casing; said tube extending alongside the outer wall of the casing to a point slightly below the hub 3. I make this provision in order to preclude the possibility of water or mud, of a roadway, entering the tube 20 and defeating the purposes of my invention. Manifestly a check-valve is arranged within the said tube 20.

In the practical operation of the invention it will be apparent that as the wheel revolves on the axle 1, the roller 10 or shaft 5 will bear against the cam 2 and because of the oval shape of said cam the roller will be forced in a direction to operate the piston 6 within the spoke of casing 4. On movement in one direction of the piston, air will be drawn inwardly through the intake tube 20 and on movement of said piston in an opposite direction within the casing, this air will be forced out of the casing 4 through tube 19, past valve 19' and into tube 17 and thence into the inner tube of the automobile tire.

When the inner tube has been inflated to a certain degree, which degree is automatically determined because of the air in the tube 17 being at the same pressure, the air in said tube will force the plunger 16 against the locking-member 12 and hence the lock will enter the notch 11 of the shaft 5. The spring 14 will thus be placed under tension and operation of the piston will be stopped. If, however, the tire springs a leak or otherwise begins to be deflated, pressure of air will be reduced in the tube 17, releasing pressure against the plunger 16 and permitting spring 14 to expand which will throw the lock out of engagement with the notch 11 of shaft 5. It will be apparent that during the time that the piston is idle, the spring 9 is under tension, but immediately on release of the shaft 5 from the locking member 12, the spring 9 will expand to force the bearing 10 against the cam 2, and hence the inflating operation will be started and continued until such time as the air in tube 17 effects the further operation of the device.

It will be gathered from the foregoing that the device is positive in operation and will maintain an even degree of pressure within a tire, and as constructed is inexpensive to produce, simple to install, and comprises no delicate parts such as are likely to become inoperative after a short period of use.

The construction illustrated and described comprises the best practical embodiment of my invention of which I am cognizant. However, I would distinctly have it understood that in the future practice of the invention, I reserve to myself the right to make such changes or modifications in the device as fairly fall within the scope of the appended claims.

Having described my invention, what I claim and desire to secure by Letters-Patent is:—

1. In a device for the purpose set forth, the combination with a vehicle axle, wheel and tire, of a cam of oval shape secured on the axle, a casing formed within one spoke of the wheel, a shaft movable within the casing, a roller secured at one end of the shaft and adapted to be on the cam, a piston secured on the opposite end of the shaft, a notch formed in the shaft, a collar formed integral within the casing, a member splined on the shaft slightly above the collar of the casing, a spring confined within the member and collar, a lock fulcrumed in the casing and having a projection that bears at times in the notch of the shaft, a casing formed in one wall of the first-named casing, having a spring resting therein and capable of abutting one end of the lock, an intake tube arranged in one wall of the first-named casing, an air tube secured in one wall of the first named casing, and also secured to the rim of the wheel whereby it communicates with the tire of the wheel, a plunger arranged in the air tube and controlled in its movements by the pressure of air within said tube; said plunger being adapted to bear at certain times on one end of the lock, and a short tube secured to the air tube and casing and a valve in said short tube for controlling passage of air therethrough.

2. In a device for the purpose set forth, the combination of a vehicle axle, a cam secured on the axle, a wheel revoluble about the axle, a tire arranged on the rim of the wheel, a casing formed in one spoke of the wheel, an air inlet tube arranged in the casing, an air outlet tube arranged in the casing opposite the inlet tube and also communicating with the tire of the wheel, a plunger actuable by the pressure within the last named tube, a shaft movable within the casing, a roller formed on the shaft, a piston formed on the shaft that controls the passage of air through the inlet and outlet tubes, a notch formed in the shaft, a lock fulcrumed within the casing and a projection that rests at times within the notch to prevent movement of the shaft said lock being controlled by movement of the plunger within the air outlet tube.

In testimony whereof I have hereunto set my hand in presence of two subscribing witnesses.

JOWEL CECIL COOPER.

Witnesses:
 FRANK R. MILLS,
 WILLIAM F. MELCHIOR.